United States Patent
Khan et al.

(10) Patent No.: US 11,797,392 B2
(45) Date of Patent: Oct. 24, 2023

(54) BACKUP AND RECOVERY OF PRIVATE INFORMATION ON EDGE DEVICES ONTO SURROGATE EDGE DEVICES

(71) Applicant: THALES DIS FRANCE SAS, Meudon (FR)

(72) Inventors: Ijaz Muhammad Khan, Vantaa (FI); Asad Mahboob Ali, Austin, TX (US)

(73) Assignee: THALES DIS FRANCE SAS, Meudon (FR)

( * ) Notice: Subject to any disclaimer, the term of this patent is extended or adjusted under 35 U.S.C. 154(b) by 373 days.

(21) Appl. No.: 17/016,164

(22) Filed: Sep. 9, 2020

(65) Prior Publication Data

US 2022/0075695 A1 Mar. 10, 2022

(51) Int. Cl.

| | | |
|---|---|---|
| G06F 11/14 | (2006.01) | |
| G06F 21/62 | (2013.01) | |
| G06F 21/78 | (2013.01) | |
| H04L 9/06 | (2006.01) | |
| H04L 9/08 | (2006.01) | |
| H04L 9/32 | (2006.01) | |

(52) U.S. Cl.
CPC ...... *G06F 11/1464* (2013.01); *G06F 11/1451* (2013.01); *G06F 11/1461* (2013.01); *G06F 11/1469* (2013.01); *G06F 21/62* (2013.01); *G06F 21/78* (2013.01); *H04L 9/0643* (2013.01); *H04L 9/0825* (2013.01); *H04L 9/3226* (2013.01); *H04L 9/3271* (2013.01)

(58) Field of Classification Search
CPC ............ G06F 11/1464; G06F 11/1451; G06F 11/1461; G06F 11/1469; G06F 21/62; G06F 21/78; G06F 21/6245; G06F 21/88; H04L 9/0643; H04L 9/0825; H04L 9/3226; H04L 9/3271; H04L 9/3242; H04L 41/0856; H04L 63/0428
See application file for complete search history.

(56) References Cited

U.S. PATENT DOCUMENTS

| | | | |
|---|---|---|---|
| 10,719,410 B2* | 7/2020 | Bronk | ................ H04W 12/033 |
| 2009/0112878 A1 | 4/2009 | Denny | |
| 2010/0318782 A1* | 12/2010 | Auradkar | ............ G06F 11/1464 |
| | | | 726/4 |
| 2014/0189362 A1* | 7/2014 | Van Den Broeck | ........................ |
| | | | H04L 41/0863 |
| | | | 713/176 |

(Continued)

FOREIGN PATENT DOCUMENTS

| | | |
|---|---|---|
| AU | 2012300852 C1 | 1/2018 |
| EP | 2003842 A1 | 12/2008 |

OTHER PUBLICATIONS

PCT/EP2021/074822, International Search Report and Written Opinion of the International Searching Authority, dated Nov. 30, 2021, European Patent Office, P.B. 5818 Patentlaan 2 NL—2280 HV Rijswijk.

*Primary Examiner* — Han Yang

(57) ABSTRACT

A system and method for backing up critical data of edge devices includes originator, surrogate, and target edge devices as well as a vault-broker server. The critical data, encrypted, is transmitted to and stored by a surrogate. The association of originator and surrogate is managed by the vault-broker server. Encryption protects the data from recovery by unauthorized parties while allowing surrogate edge devices to determine if recovery attempts are made by authorized parties.

35 Claims, 8 Drawing Sheets

(56) References Cited

U.S. PATENT DOCUMENTS

2019/0087432 A1* 3/2019 Sion .................. G06F 16/13
2019/0182042 A1* 6/2019 Ebrahimi ............ H04L 9/3236

\* cited by examiner

BACKUP AND RECOVERY OF PRIVATE INFORMATION ON EDGE DEVICES ONTO SURROGATE EDGE DEVICES

BACKGROUND OF THE INVENTION

The present invention relates, generally, to edge devices, and, more particularly, to secure backup and recovery of private information stored on edge devices.

An edge device is a device located on a network that may either be a boundary between two networks, such as a gateway or a router, or an endpoint of a network, such as mobile telephone, an Internet of Things (IoT) gateway, sensor, controller, or actuator.

Often edge devices must store very sensitive information, for example, cryptographic keys that may be used for secure communication with other devices located on a network, account numbers, login credentials, and personal information pertaining to the owner of a particular edge device. Such information, which needs to be protected from unauthorized access both on the edge device itself, when in transit while being communicated over a network to other devices, or when stored on other devices, is referred to herein as private information.

One mechanism by which private information stored on an edge device may be protected is to store it in a secure element. A secure element (SE) is a tamper-resistant electronic component that is typically used for storing host applications and the confidential and cryptographic data associated with those host applications. Herein, the term secure element is defined as an embedded integrated circuit that employs tamper resistant features to protect applications and data stored thereon.

Secure Elements are described in Introduction to Secure Elements, Global Platform, globalplatform.org/wp-content/uploads/2018/05/Introduction-to-Secure-Element-15May2018.pdf (2018), incorporated herein by reference.

Therefore, the private information such as cryptography keys are both critical to their owners and must be held secret. Therefore, storing such information on secure elements protect the information from access from unauthorized parties.

Secure elements maybe found in many different applications, e.g., SIM cards for mobile telephones, access badges for both network and physical access, and also in Internet-of-Things (IoT) devices such as set-top boxes for television services, controllers for machines and vehicles.

A secure element may be an edge device.

All machines are susceptible to damage, destruction, misplacement, and theft. Thus, an unfortunate, but highly likely, end-of-life scenario for an edge device is its loss in some manner. An unfortunate consequence of such loss is the loss of the private information stored on the edge device, which can further result in the loss of access to data that is encrypted using keys stored in that private information. It is, therefore, desirable to have a mechanism for backing up private information, including cryptographic keys, stored on an edge device.

A first mechanism for backing up private information stored on edge devices linked to a particular individual or work group to whom a particular edge device belongs entails storing the private information on another device, e.g., on a personal computer or server belonging to that entity or work group. However, storing the information in that manner may entail storing it at a lower security level than the security level of the device from which it is backed up. For example, a data stored on a secure element of an edge device is very safe as compared to data stored, even in encrypted form, in a file on a hard disk or in a flash drive. Thus, such alternate storage of the private information defeats the objective of keeping it secure from unauthorized access. For example, if such a backup storage computer is hacked, the hacker may obtain access to the private information. Furthermore, such a mechanism is burdensome on the individuals or workgroups linked to such secure elements.

Another mechanism for providing backup of private information stored on edge devices is storing the private information on a centralized backup server, e.g., a company-wide server or an issuer-provided server. There are similar problems associated with that approach. Centralized backup servers may not have as high a level of security. If such a server is hacked, private information related to many edge devices may be divulged. Furthermore, the approach requires infrastructure investment and maintenance for the backup server.

From the foregoing it is apparent that there is a need for an improved method to backup private information, such as cryptographic keys and account numbers, stored on edge devices and to provide a mechanism for recovery of such information in the event an edge device is lost or damaged.

SUMMARY

A method for backing up critical data stored on an originator edge device associated with a user such that the backed up critical data maybe recovered onto a target device. To backup critical data, requesting, by the vault-broker server, the originator edge device to create an export backup record of critical data stored on the originator edge device. Obtaining, by the originator edge device, a backup-retrieval code from the user of the originator edge device. Generating, by the originator edge device, the backup record in response to the request for the export backup record, the backup record being a function of the backup-retrieval code, a cryptographic key, and the critical data being backed up, and transmitting a backup-response message including the backup record, by the originator edge device to the vault-broker server. The backup-response message including the backup record is transmitted by the vault-broker server to the surrogate edge device, which stores the backup record. The vault-broker server stores an association between the originator edge device and the surrogate edge device on the vault-broker server.

In an aspect, an implied circle of trust is established among the originator edge device and a surrogate edge device based on a common cryptographic key issued by a trusted certificate authority and edge devices may be provisioned with certificates by the trusted certificate authority. The surrogate edge device uses the certificates to verify that the originator edge device, the target edge device, and surrogate edge device belong to the same implied circle of trust.

In an aspect, the backup record is generated by creating a wrapping key, which may be generated as a function of a backup-retrieval code, encrypting the critical data using the wrapping key, hashing the wrapping key or the backup-retrieval code, and creating the backup record from the encrypted critical data and the hashed value. The backup record message is generated by encrypting the backup record with a cryptographic key of the surrogate.

In a further aspect, the backed up private data is recovered to a target edge device, by generating, by the target edge device, a recovery-retrieval-code message and transmitting the recovery-retrieval-code message to the vault-broker server, determining, by the vault-broker server, a surrogate edge device on which the backup record of the originator edge device from which recovery is sought (the recovery surrogate edge device) has been saved, forwarding, by the vault-broker server, the recovery-retrieval-code message to the recovery surrogate edge device, validating, by the recovery surrogate edge device, the recovery-retrieval-code message, and upon successful validation of the recovery-retrieval-code message, transmitting a recovery-response message including the backup record of the originator device to the vault-broker server or upon failure of the validation of the recovery-retrieval-code message, and transmitting a recovery-response message including an error code. The vault-broker server forwards the recovery-response message to the target edge device. If the recovery-response message includes the backup record, recovering, by the target edge device, the backup record. On the other hand, if the recovery-response message includes an error code, the user is offered an additional attempt to provide the correct backup-retrieval code.

In an aspect, the recovery-retrieval-code message includes a hash of an attempted backup-retrieval code and an encryption key certificate of the target device.

The implied circle of trust may be established using a shared key or knowledge of a certificate of a trusted certificate authority.

The backup retrieval code may be a personal identification number, a biometric, a password, or a challenge-response dialog.

The implied circle of trust may include multiple surrogate edge devices wherein the method described herein is repeated for a plurality of such multiple surrogate edge devices.

In an aspect, a system including vault-broker server, an originator edge device, a surrogate edge device, and a target edge device performs the technology for backing up and recovering critical data as described herein.

DETAILED DESCRIPTION OF THE INVENTION

Figure 1:
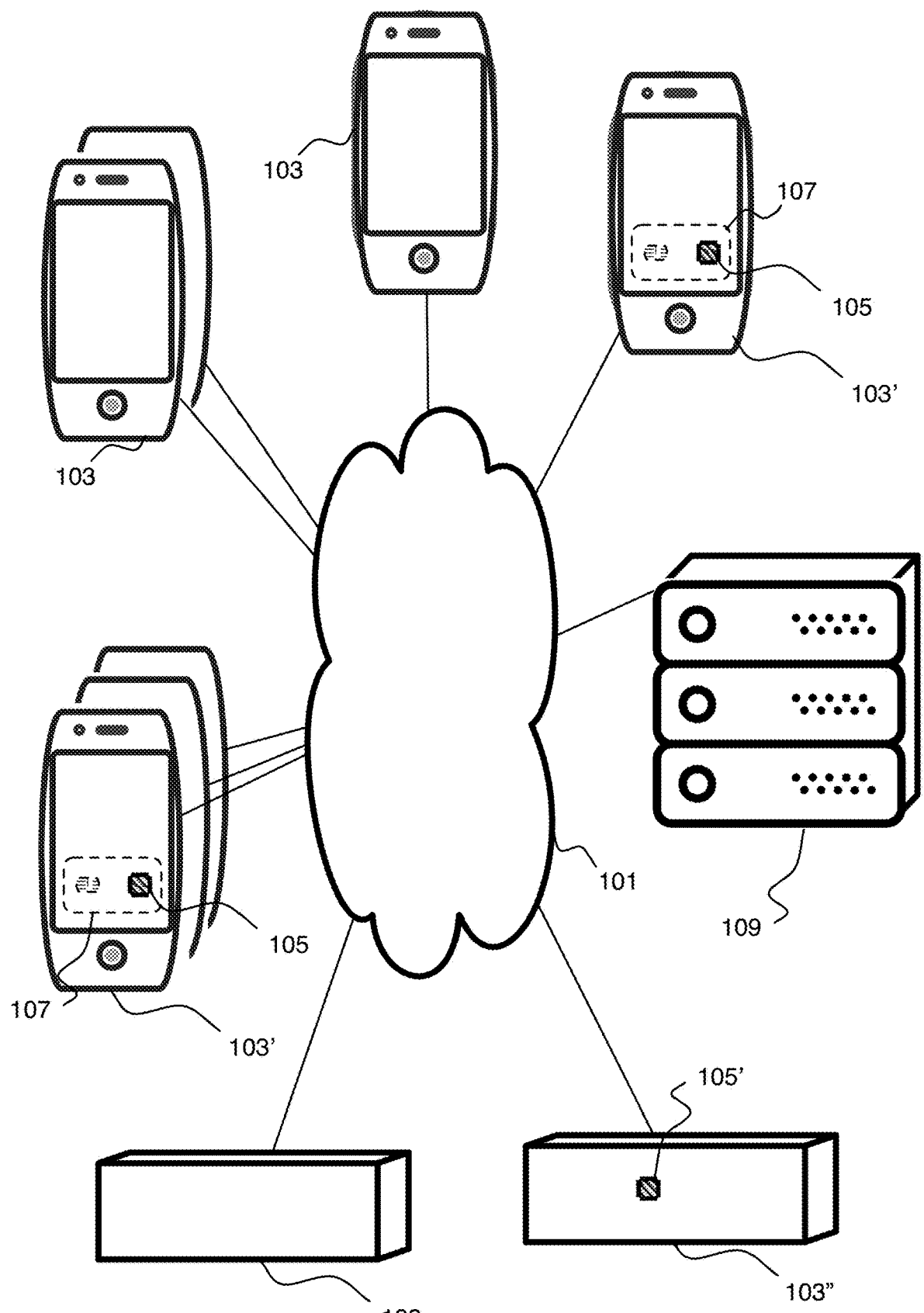
FIG. 1 is an illustration of a network having multiple edge devices.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides a mechanism by which private information stored on edge devices, including secure elements, can be backed up securely and efficiently and recovered from such backup copies without added burden and risk of locally backing up such information by individuals, work groups, organization, or issuers.

FIG. 1 is an illustration of a network 101 connecting multiple edge devices 103. Some edge devices 103' have secure elements 105. The edge devices 103/103' cooperate to backup private information of each other via brokerage services provided by a vault-broker server 109. In FIG. 1, edge device 103 are depicted as smartphones and boxes that maybe some type of device controllers. However, these are merely examples. The technology described herein is applicable to any network-connected edge device.

The secure element 105 may be an integrated part of an edge device 103, as illustrated with edge device 103" and secure element 105'. Alternatively, the secure element 105 is located, on a removable device 107 such as, for example, a SIM card, a UICC, an SD card, or in a USB connectable device.

If a secure element 105/105' can communicate with other nodes it may be considered an edge device 103.

As described in greater detail hereinbelow, private information stored on an edge device 103 is backed up, in an encrypted form, on one or more other edge devices 103. The former is referred to herein as an originator edge device and the latter, as a surrogate edge device. The concept of private information being stored on an edge device 103 includes the private information being stored on a secure element 105 contained in the edge device 103 or in another memory structure, e.g., a non-volatile memory, of the edge device 103.

As described in greater detail below, implied circles of trust (ICT) may be established between various edge devices 103 wherein the edge devices 103 that belong to the same circle of trust share knowledge of a common trust key.

The vault-broker server 109 contains a database containing information linking edge devices 103 to implied circles of trust and a database containing information linking originator secure elements to one or more surrogate secure elements on which the private information stored on originator secure elements are backed up in encrypted form.

Figure 2:
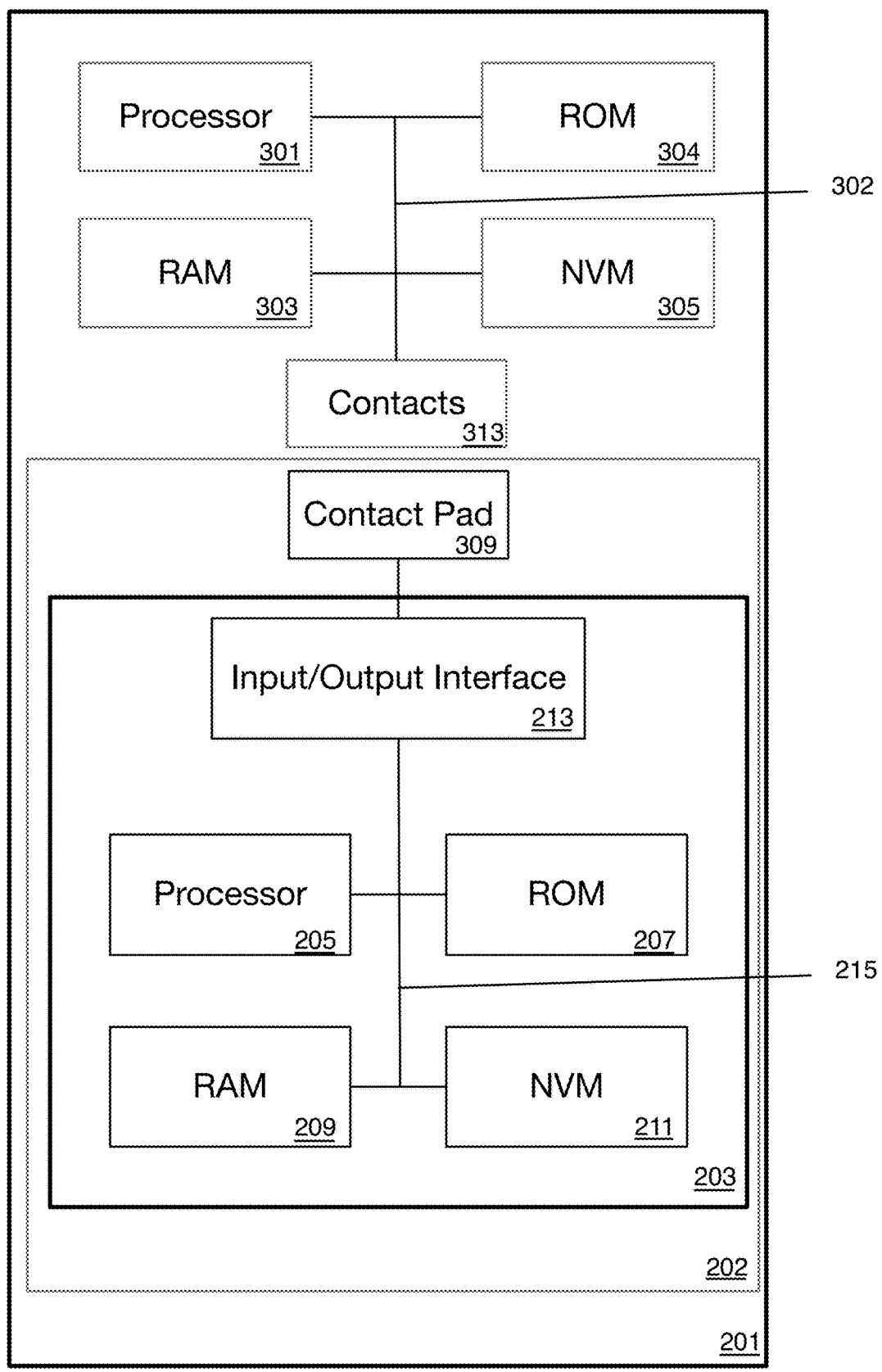
FIG. 2 is a high-level block diagram of a device architecture of an edge device of FIG. 1, including a secure element.

FIG. 2 is a high-level block diagram of a device architecture of an edge device 201 including a secure element 203. In the example of FIG. 1, an edge device 103 correspond to edge device 201 of FIG. 2. The secure element 203, conversely, corresponds to either secure element 105 or integrated secure element 105'. Thus, the secure element 203 may be located on a removable device 202 (corresponding to removable device 107) as shown in FIG. 2 or integrated into the edge device 201.

The edge device 201 may include a processor 301 connected via a bus 302 to a random-access memory (RAM) 303, a read-only memory (ROM) 304, and a non-volatile memory (NVM) 305.

Conversely, the secure element 203 may also include a processor 205, a ROM 207, a RAM 209, and a non-volatile memory 211 connected via a bus 215. The secure element 203 further includes an input/output interface 213 for connecting the processor 205, again typically via the bus 302, to a contact pad 217 by which the secure element 203 may be connected to contacts 313 located for example on a bus 302 of the edge device 201.

As noted above, an edge device 201 does not necessarily contain a secure element 203 and, vice versa, a secure element 203 may be an edge device 201 as described herein.

Figure 3:
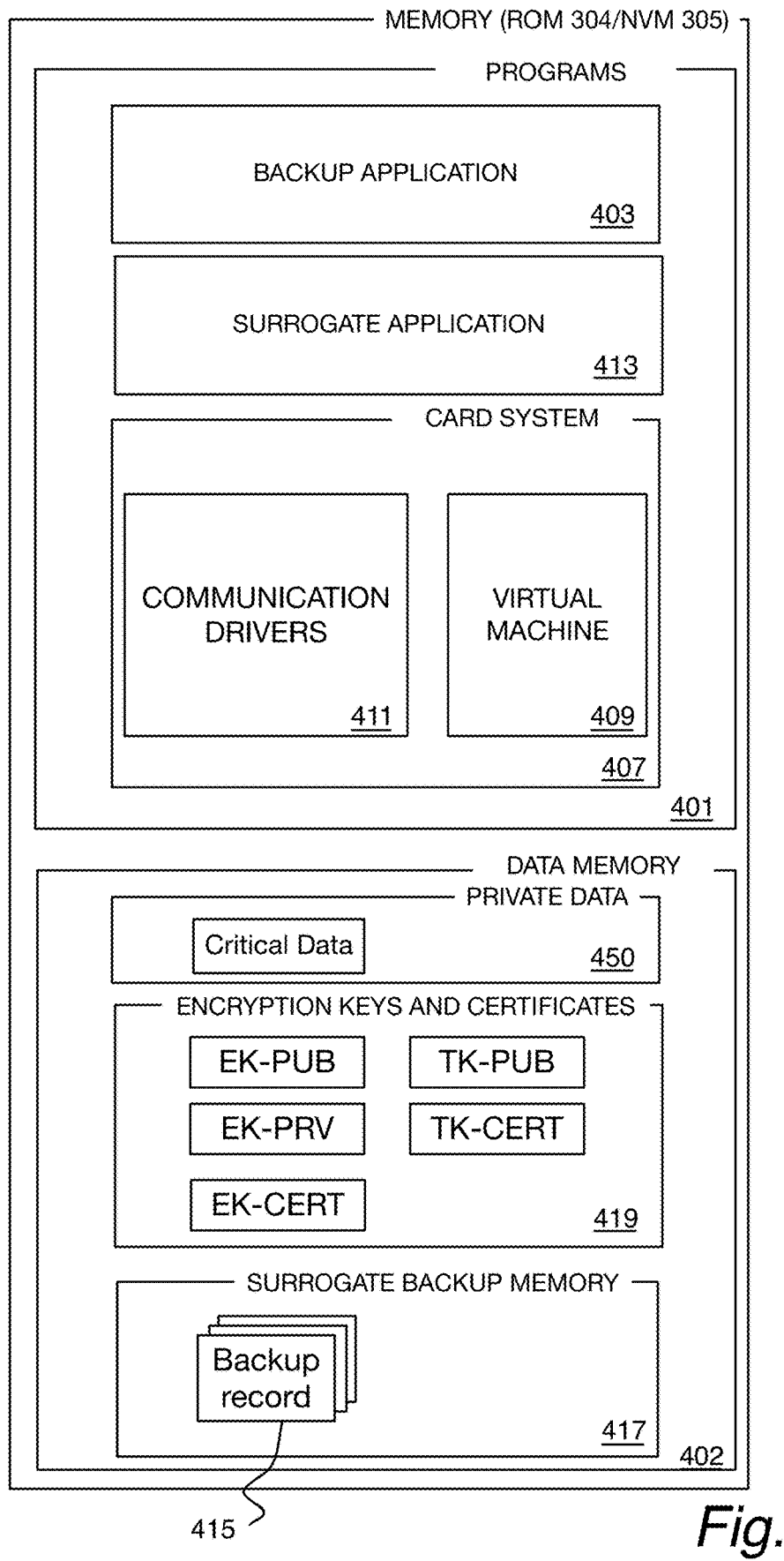
FIG. 3 is a high-level block diagram of illustrating programs located in the program memory as well as private information located in a data memory of the NVM of an edge device of FIGS. 1 and 2

The ROM 304 and/or NVM 305 may include a program memory 401 for storing programs executable by the processor 301, as is illustrated in FIG. 3.

FIG. 3 is a high-level block diagram illustrating programs located in the program memory 401 as well as private information located in a data memory 402 of the NVM 305. While it is here depicted that the computer programs 401 are all co-located in the ROM 304 or the NVM 305, in actual practice there is no such restriction as programs may be spread out over multiple memories and even temporarily installed in RAM 303. Furthermore, the edge device 201 may include multiple ROMs or NVMs.

In. FIG. 3, the data memory 402 is located in the memory (e.g., ROM 304 or NVM 305) of the edge device 201. In alternative embodiments, where the edge device 201 includes a secure element 203, the data memory 402 is preferentially located on the secure element 203 thereby providing additional security to the private information.

The program memory 401 include card system programs 407, which may include a virtual machine 409, as well as, communications drivers 411 for communicating over the communications interface 307. The card system 407 may also include a virtual machine or other interpreter 409 for executing programs stored on the edge device 201.

The programs 401 also include a backup application 403 through which private data 405 may be backed up on other networked secure elements as described hereinbelow. The backup application 403 interacts with a vault-broker server application 503 executing on a vault-broker server 109 to backup the private data 405 on surrogate edge devices and to recover data from such surrogate edge devices.

As discussed in greater detail below, the backup application 403 generates encrypted backup records of the private data 405, which may include cryptographic keys, transmits the encrypted backup records to the vault-broker server 109, which, in turn, transmits the encrypted backup records to other edge devices 201, herein called surrogate edge devices, for storage. When an edge device 201 is lost or damaged, a user of that edge device may recover the backup record from the surrogate edge device that stores the backup record via the vault-broker server 109.

When the vault-broker server 109 receives a backup record from an originator edge device 201, the vault-broker server 109 transmits that record to a surrogate edge device. The surrogate edge device receives the backup record from the vault-broker server 109. The surrogate edge device 201 contains a surrogate application 413 which operates to receive such backup records from the vault-broker server 109 and stores the backup records 415 in a surrogate-backup-record memory 417.

Provisioning

Each edge device 201 is provisioned by the manufacturer or the issuer of the edge device with various encryption keys and certificates 419. These keys and certificates include:

Encryption keys: Public-Private key pair: EK-pub and EK-prv, and digital certificate EK-cert. EK-pub, EK-prv, and EK-cert are unique to each edge device 201 and are provisioned in the manufacturing stage of the edge device 201 under controlled settings. The EK-cert digital certificate is issued at the manufacturing stage by a trusted certificate authority (Trust Key CA).

Trust Key (TK): consisting of a public key and certificate: TK-pub and TK-cert. These keys and certificates are common to all edge devices 201 that belong to an implied circle of trust (ICT). An implied circle of trust is defined herein to include all devices that have a common Trust Key. Each such device has a certificate signed using the same TK and can therefore verify each other's membership in the implied circle of trust. For example, all the edge devices belonging to an enterprise, governmental department, or business unit with a larger organization may have the same TK. In one use case, an implied circle of trust may be formed among all subscribers to a mobile network operator (MNO). The TK-pry (the private key corresponding to TK-pub) is used to digitally sign EK-cert. Therefore, the Trust Keys may be considered as certificate authority keys.

Figure 4:
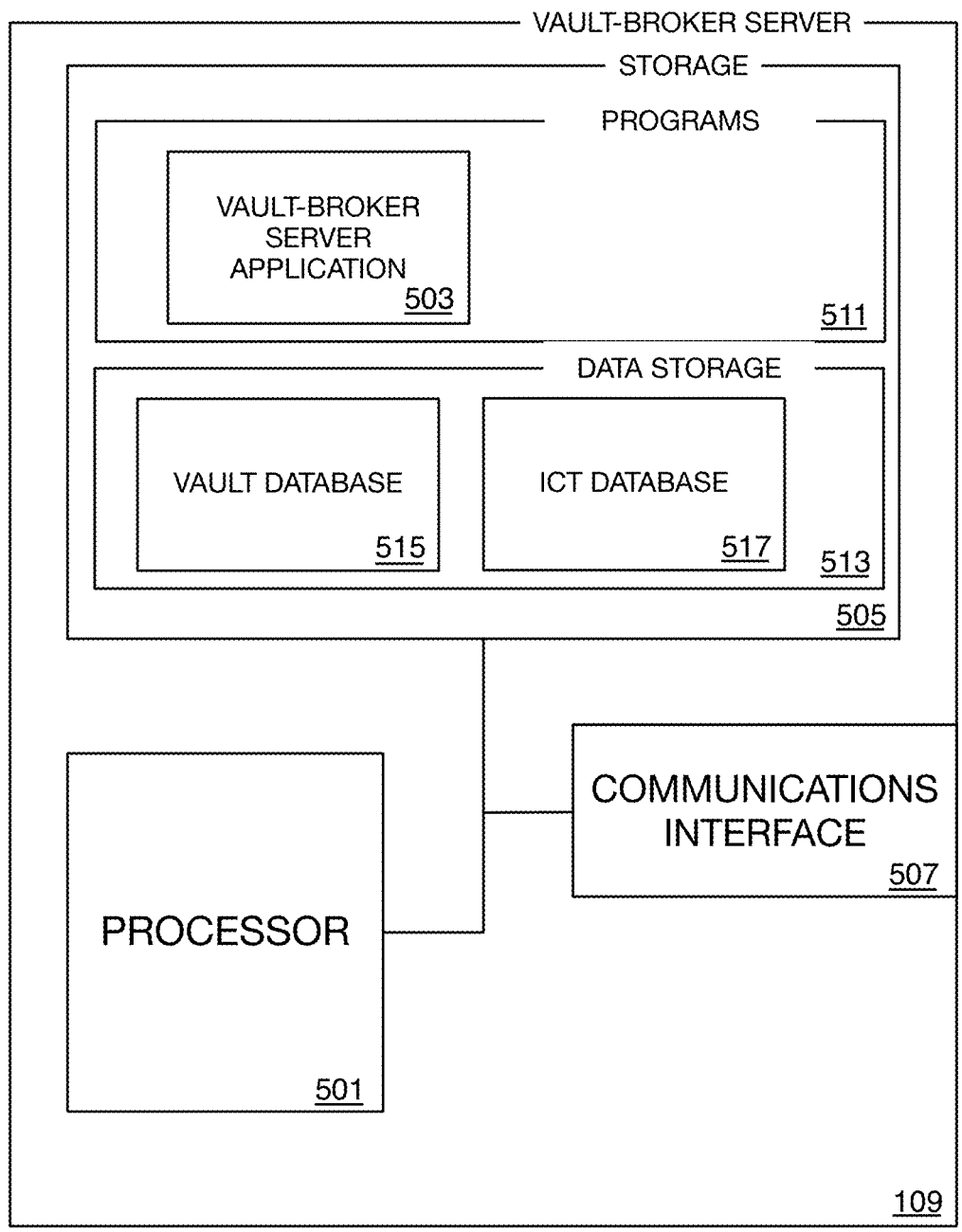
FIG. 4 is a high-level architecture diagram for the vault-broker server of FIG. 1.

FIG. 4 is a high-level architecture diagram for the vault-broker server 109. The vault-broker server 109 orchestrates the backup and recovery of private data from an edge device 201. It establishes trust with the backup application 403 and surrogate application 413 on the originator edge device and the surrogate edge device and sends data and commands to these edge devices. Mechanisms for establishing trust between applications executing on devices and servers are well-known.

While the vault-broker server 109 connects various edge devices to one another, the private data of these edge devices 201 are end-to-end encrypted using the public key (EK-pub) of the edge device 201 while in transit (as well as when stored on surrogate edge devices). Therefore, it is not possible to discover the private data by having access to the vault-broker server 109 or the data stored thereon.

The primary service of the vault-broker server 109 is to manage the pairing between originator edge devices and surrogate edge devices in a manner that that does not breach security requirements for the critical private data.

The vault-broker server 109 contains a processor 501 and a non-volatile storage 505 as well as a communications interface 507. The non-volatile storage 505 contains programs 511, which include the vault-broker server application 503 for communicating with the corresponding backup application 403 of originator edge devices 201a as well as surrogate application 413 of surrogate edge device 201b (see, FIGS. 5 and 6).

The non-volatile storage 505 may also include data storage 513 and may be used for storing a vault-broker server database 515, which links originator edge devices and the surrogate edge devices, which store backup data records 415 for respective originator edge devices. If a vault-broker server 109 manages backup of edge devices in multiple implied circles of trust, the vault-broker server 109 may also contain an implied circle of trust (ICT) database 517 which contains linkages between edge devices and ICTs. The vault-broker server 109, when tasked with backing up data from an originator edge device may then determine possible surrogate edge devices within the same circle of trust as the originator edge device.

Backup of Private Data

Figure 5:
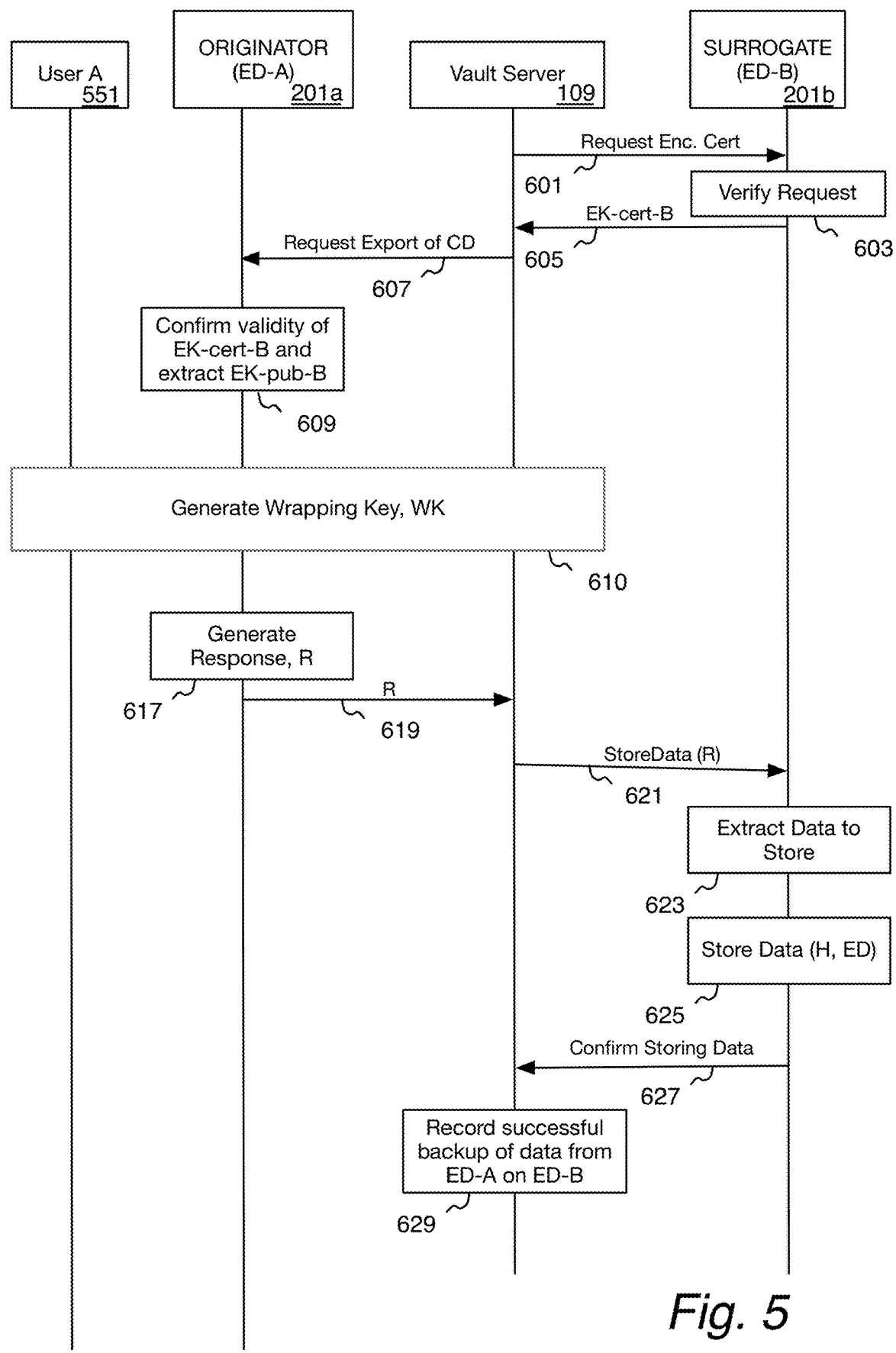
FIG. 5 is a data-flow diagram illustrating the backup of data from an originator edge device to a surrogate edge device via the vault-broker server.

FIG. 5 is a data flow diagram illustrating the backup of data from an originator edge device 201a (ED-A) to a surrogate edge device 201b (ED-B) via the vault-broker server 109.

A few conventions:

E {x}y—means encrypt x using y as a key
D {x}y—means decrypt x using y as a key
A=f(b)—means A is a cryptographic one-way function of B. For example, a pseudo-random function that converts a password or PIN into a cryptographic key with higher entropy.

The originator edge device 201a (ED-A) has the following keys associated with it:

EK-pub-A—its public key
EK-prv-A—its private key
EK-cert-A—its digital certificate, which is the EK-pub-A signed with the TK-prv The surrogate edge device 201b (ED-B) has the following keys associated with it:

EK-pub-B—its public key
EK-prv-B—its private key
EK-cert-B—its digital certificate, which is the EK-pub-A signed with the TK-prv While the illustrated embodiments utilize public key encryption, alternative embodiments utilize shared-secret encryption technologies.

The process of backing up critical data (CD1-A) from an originator edge device (ED-A) 201a to a surrogate edge device (ED-B) 201b via the vault-broker server 109 starts with the vault-broker server 109 selecting a surrogate device 201b from the same ICT as the originator device and requesting that surrogate edge device 201b to provide its encryption certificate (EK-cert-B), step 601.

The surrogate edge device 201b verifies that the request is originating from a valid vault-broker server. This verification may be performed, for example, by using a shared secret between the vault-broker server 109 and the surrogate edge device 201b or by the vault-broker server 109 signing the request (e.g., using the Trust Key issued certificate (TK-cert-sv), which the surrogate edge device 201b can verify.

Messages below are similarly verified by the respective recipients. However, for clarity of explanation, the verification is not discussed further.

The surrogate edge device 201b replies with its encryption certificate, EK-cert-B, which contains the encryption key of the surrogate edge device 201b, EK-pub-B, step 605.

The vault-broker server 109 requests that the originator edge device 201a exports its critical data (CD1-A), step 607. The request includes the encryption certificate of the surrogate edge device (ED-B) 201b, i.e., EK-cert-B.

The originator edge device (ED-A) 201a verifies the validity of the received certificate and if it is determined to be valid, extracts the public key EK-pub-B, step 609. The validation and extraction by the originator edge device 201a is possible because all edge devices 201 are provisioned with TK-cert and TK-pub.

A wrapping key (WK) is generated, step 610. The wrapping key is used by the originator device to encrypt the critical data. The generation of the wrapping key may involve any combination of the user A 551, the originator edge device 201a, and the vault-broker server 109. For example, in the embodiment of FIG. 7 (discussed herein below), the wrapping key is based on a PIN entered by the user A 551. In other embodiments, the wrapping key is generated and stored by the vault-broker server 109.

One advantage of the embodiment where the wrapping key is generated and stored by the vault-broker server is to avoid the ramifications of the user 551 forgetting their PIN, e.g., the impossibility of recovering the backed-up data. Conversely, generating and saving the wrapping key on the vault-broker server 109 introduces some security risk that in some implementations may not meet security policies that only allow users to access their own data.

The originator edge device (ED-A) 201a generates a response, R, that is a response to the request to export the critical data (from step 607), step 617. The response R is generated using the following mechanism from the critical data (CD1-A) to be backed up:

| | |
|---|---|
| ED ← E{CD1-A} WK | ! encrypt the critical data with the wrapping key |
| H ← SHA-256 (WK) | ! hash the wrapping key (WK) using SHA-256 (or other hashing function) |
| Payload ← H+ED | ! determine "payload" |
| R ← E{Payload} EK-pub-B | ! encrypt using the public key of the surrogate |

The originator edge device (ED-A) 201a transmits the response R to the vault-broker server 109, step 619.

The vault-broker server 109 forwards the response R to the surrogate edge device (ED-B) 201b as a "store data" command, step 621.

The surrogate edge device (ED-B) 201b extracts the data that it is to store, step 623, using the following mechanism:

| | |
|---|---|
| Payload ← D{R} EK-prv-B | ! decrypt the message R using the private key of the surrogate |
| H,ED ← parse (Payload) | ! parse the payload to determine H and ED |

The surrogate edge device (ED-B) 201b stores two pieces of data as a backup record 417 in its surrogate-backup memory 417, namely, H, the hash value, which may be computed from the wrapping key, and ED, the encryption of the critical data CD1-A, step 625. However, from the information stored and available on the surrogate edge device (ED-B) 201b, it is not possible to derive the wrapping key (WK) or CD1-A using available interfaces. Furthermore, it is also not possible to know, from the perspective of the surrogate edge device (ED-B) 201b, which edge device the data belongs to. That association is only known to the vault-broker server 109.

The surrogate edge device (ED-B) 201b sends a message confirming that the data extracted from R has been stored, step 627.

The vault-broker server 109 records that the data from the originator edge device (ED-A) 201a has been successfully stored on the surrogate edge device (ED-B) 201b in the vault database 515, step 629. The vault database 515 maintains a record for each location that backup data from one edge device (originator) has been stored on another edge device (surrogate).

Data from any originator edge device (ED-A) 201a maybe stored on multiple surrogate edge devices (ED-B) 201b. Thus, the procedure of FIG. 5 may be repeated several times with different secure elements taking the role of the surrogate edge device (ED-B) 201b. Conversely, any surrogate edge device (ED-B) 201b may be a surrogate for multiple originator edge devices (ED-A) 201a. Thus, the procedure of FIG. 5 may be repeated for several edge devices each taking the role of the originator edge device (ED-A) 201a where the surrogate edge device (ED-B) 201b is one and the same surrogate edge device (ED-B) 201b. Thus, the vault database 515 may be a many-to-many mapping of originator edge devices (ED-A) 201a to surrogate edge devices (ED-B) 201b.

Recovery of Backed-up Data

Figure 6:
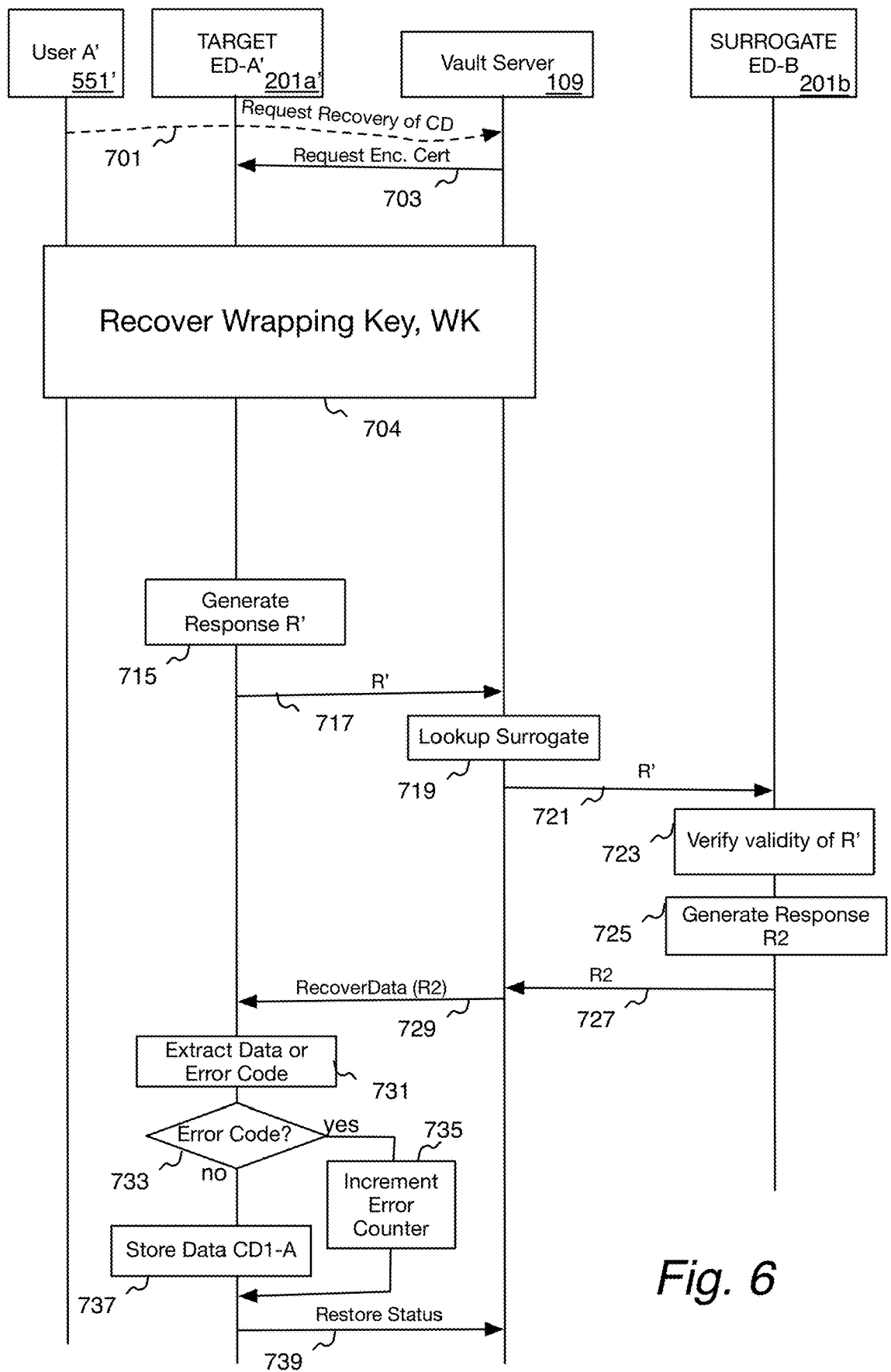
FIG. 6 is a data-flow diagram of a mechanism for recovery of data from one surrogate edge device into another edge device.

Turning now to the recovery of backed-up data from a surrogate edge device (ED-B) 201b, which is illustrated in the timing sequence diagram of FIG. 6. FIG. 6 is a data-flow diagram illustrating a mechanism for recovery of data from one surrogate edge device (ED-B) 201b into another edge device 201, here referred to as the target edge device (ED-A') 201a', in the same implied circle of trust. The target edge device (ED-A') 201a' does not need to be the same edge device 201 as the one from which the backed-up data originated. Rather, a typical application is the loss of the originator edge device (ED-A) 201a thereby necessitating the recovery of the data by the user of the originating edge device (ED-A) 201a into a new target edge device (ED-A') 201a'.

A preliminary step is that the User A' 551' requests recovery of the data from the vault-broker server 109, step 701. This may be an out-of-band request, e.g., the user A' 551' purchasing a new edge device 201, the target edge device (ED-A') 201a', and requesting recovery of the data from the service operator or mobile network operator, who operates the vault-broker server 109.

Typically the user A 551 of FIG. 5 is the same individual or entity as the user A' 551' of FIG. 6. However, one task of the surrogate ED-B 201b is to verify that. Furthermore, in embodiments in which the vault-broker server stores the wrapper key, the vault-broker server 109 may require authentication of the user A' 551' before retrieving the wrapper key associated with the originator edge device ED-A 201a of user A 551.

The vault-broker server 109 asks the target edge device (ED-A') 201a' for its encryption key certificate, EK-cert-A', step 703.

As discussed hereinabove, the critical data is encrypted using a wrapping key (WK). To recover the data, the wrapping key must be recovered, step 704. The wrapping key may, for example, have been stored by the vault-broker server. If the user demonstrates to the satisfaction of the vault-broker server that the user A' 551' is the legitimate owner of the critical data stored from the originator edge device ED-A 201a, the vault-broker server retrieves the stored wrapper key (WK).

Figure 7:
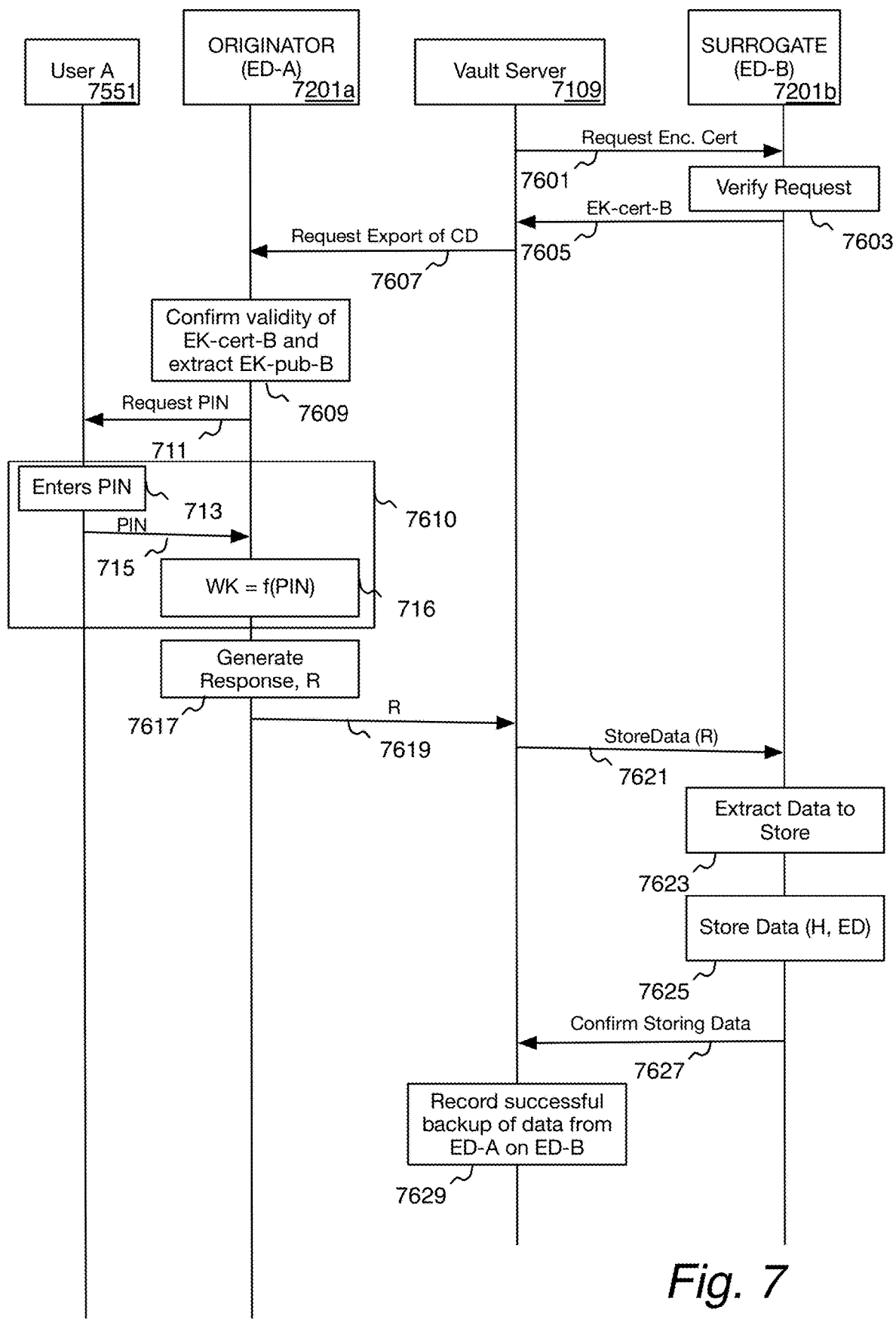
FIG. 7, which corresponds to FIG. 5, is a data-flow diagram illustrating backup of data in the manner of the data-flow diagram of FIG. 5 wherein the wrapping key used to encrypt the backup data is based on a user-entered PIN.
Figure 8:
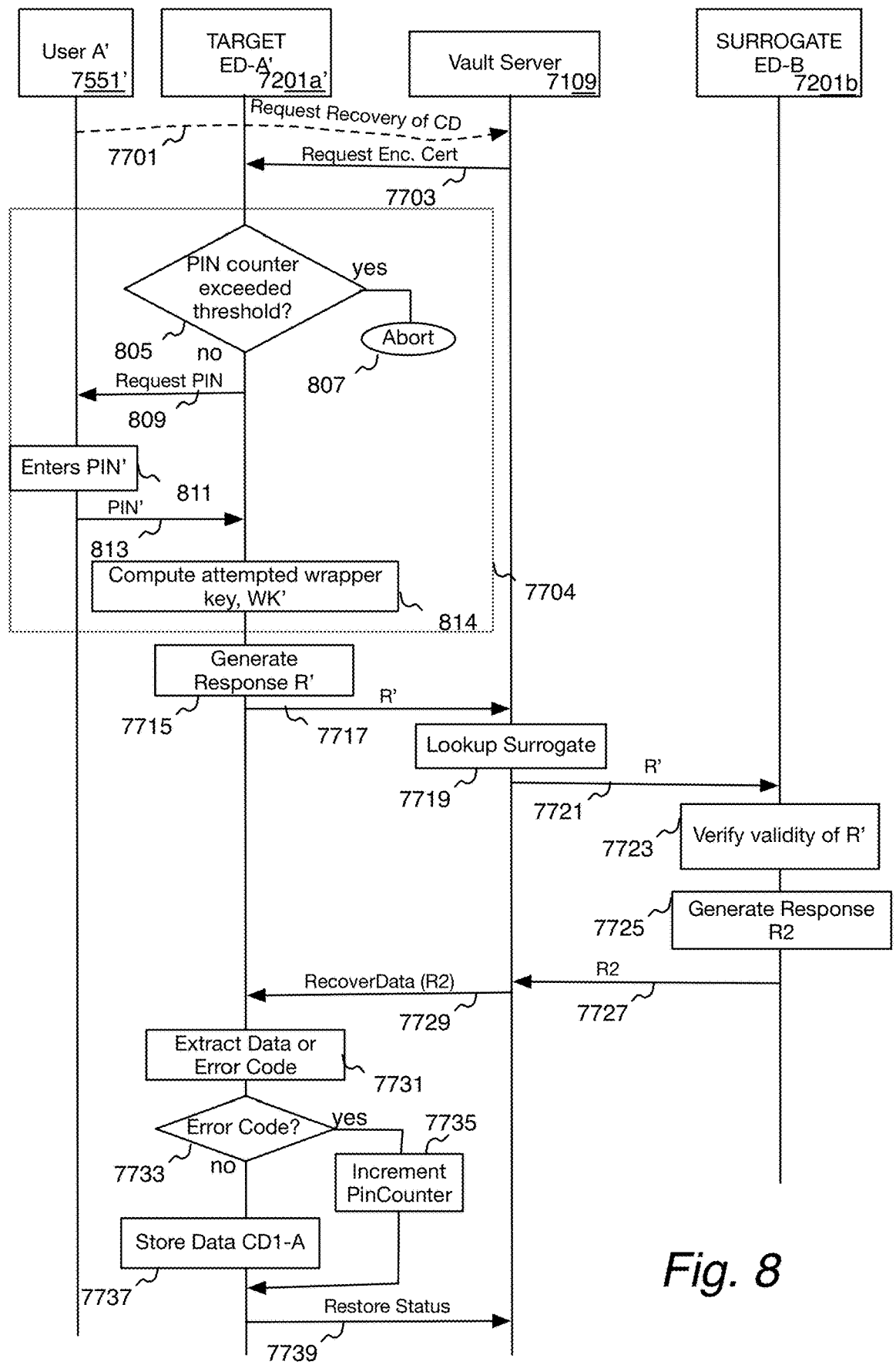
FIG. 8 is a data-flow diagram of a mechanism for recovery of data from one surrogate edge device into another edge device corresponding to the backup mechanism of FIG. 7.

In the alternative embodiment of FIG. 7, the wrapping key is generated using a one-way cryptographic function f(x) using a PIN entered by the user. The corresponding data-recovery embodiment is illustrated in FIG. 8, which is discussed in greater detail hereinbelow.

The target edge device (ED-A') 201a' generates a response R' from the wrapping key WK' using the following mechanism, step 715:

| | |
|---|---|
| H' ← SHA-256 (WK') | ! hash value computed from the attempted WK' using SHA-256 (or other hashing function) |
| Payload ← H'+EK-cert-A' | ! determine "payload" |
| R' ← Payload | |

The target edge device (ED-A') 201a' transmits the response R' to the vault-broker server 109, step 717.

Upon receipt of the response R', the vault-broker server 109 looks up which edge device 201 is a surrogate edge device that has stored a backup for the requested data, step 719; here, the surrogate edge device (ED-B) 201b.

The vault-broker server 109 forwards the request R' to the surrogate edge device (ED-B) 201b, step 721.

The surrogate edge device (ED-B) 201b verifies the request R', step 723. The verification has several substeps:

Verify EK-cert-A' as being signed by TK-cert.

Extract EK-pub-A'. EK-cert-A' is a signed version of EK-pub-A'. The certificate contains the EK-pub-A'. Thus, EK-pub-A' is trivially recovered from EK-cert-A'.

Compare H' against the stored H, stored in the backup record 415 corresponding to the received EK-cert-A' stored in Step 625 of FIG. 5.

Reject the request if either EK-cert-A' is not verified or if H' is not equal to H. The rejection is reflected in the response message.

If the verification is satisfied, the edge device B 201b generates a response R2 as follows (step 725):

| | |
|---|---|
| If verified: | |
| Payload ← SuccessCode + ED | ! Success, lookup ED and add to payload |
| Else | |
| Payload ← Error code | ! Verification failed, send error code |
| R2 ← E{Payload} EK-pub-A' | ! encrypt the Payload |

The surrogate edge device (ED-B) 201b sends the generated response R2, which contains either an error code or a message with a success code with the encrypted data, step 727. The encrypted data (ED) is the same encrypted data as originally supplied by the originator edge device (ED-A) 201a as part of the response R generated in step 617 of FIG. 5 and transmitted as a storeData command to the surrogate edge device (ED-B) 201b in step 621 of FIG. 5.

The vault-broker server 109 forward the response R2 in a recover data command, step 729.

The target edge device (ED-A') 201a' extracts the data from the response R2 as follows, step 731:

| | |
|---|---|
| Payload ← D{R2} EK-prv-A' | ! decrypt the Payload using private key of the new target edge device (ED-A') 201a' |
| If Payload = Error code    ErrorCount++ | ! Error code received; bad WK ! Increment the Error Count |
| Else    ED ← Parse (Payload) | ! Success, Extract the ED from the Payload by removing the SuccessCode |
|    CD1-A ← D{ED}WK' | ! Decrypt the WK encrypted data to recover the backed-up data |

In case the Error code was received, step 733, the error count is incremented, step 735. Otherwise, the CD1-A is recovered and saved in the target edge device (ED-A') 201a', step 737 and error count is reset to default.

Regardless of successful recovery or an error, the restore status is reported back to the vault-broker server 109, step 739. In the event of an error, the process may be repeated and the user A 551 may attempt additional wrapper-key recoveries until the threshold is exceeded. If the vault-server broker 109 stores the wrapper-key, there should not be any errors. However, the vault-server broker 109 may have some algorithmic approach to generate the wrapper key (WK'), e.g., based on a username and password, which may require repeated attempts by the user.

Backup and Recovery of Private Data Using PIN to Generate the Wrapping Key

Backup of Private Data

The process of backing up critical data (CD1-A) from an originator edge device (ED-A) 7201a to a surrogate edge device (ED-B) 7201b via the vault-broker server 7109 starts with the vault-broker server 7109 requesting the surrogate edge device 7201b to provide its encryption certificate (EK-cert-B), step 7601 (Note: many steps of FIGS. 7 and 8 are the same or serve an analogous purpose to corresponding steps in FIGS. 5 and 6, respectively. In FIGS. 7 and 8 the reference numerals for such steps as well as the entities involved are prefixed with the numeral 7. For the convenience of the reader, with that modification made, the describing text is replicated in the description of FIGS. 7 and 8).

The surrogate edge device 7201b verifies that the request is originating from a valid vault-broker server. This verification may be performed, for example, by using a shared secret between the vault-broker server 7109 and the surrogate edge device 7201b or by the vault-broker server 7109 signing the request (e.g., using the Trust Key issued certificate (TK-cert-sv), which the surrogate edge device 7201b can verify.

Messages below are similarly verified by the respective recipients. However, for clarity of explanation, the verification is not discussed further.

The surrogate edge device 7201b replies with its encryption certificate, EK-cert-B, which contains the encryption key of the surrogate edge device 7201b, EK-pub-B, step 7605.

The vault-broker server 7109 requests that the originator edge device 7201a exports its critical data (CD1-A), step 7607. The request includes the encryption certificate of the surrogate edge device (ED-B) 7201b, i.e., EK-cert-B.

The originator edge device (ED-A) 7201a verifies the validity of the received certificate and if it is determined to be valid, extracts the public key EK-pub-B, step 7609. The validation and extraction by the originator edge device 7201a is possible because all edge devices 7201 are provisioned with TK-cert and TK-pub.

A wrapping key (WK) is generated, step 7610. The wrapping key is used by the originator device to encrypt the critical data. The generation of the wrapping key may involve any combination of the user A 7551, the originator edge device 7201a, and the vault-broker server 7109. In the embodiment of FIG. 7, the wrapping key is based on a PIN entered by the user A 7551.

To generate the wrapping key, step 7610', the user A 7551 is requested to enter their PIN, step 711, and the user A 7551 enters their PIN, step 713, which is sent back to the originator edge device (ED-A) 7201a in a response, step 715. This PIN is used to generate a wrapping key, WK, using a cryptographic one-way function f(x), step 716:

| | |
|---|---|
| WK ← f(PIN) | ! encryption wrapping key |

The PIN is both used to generate a wrapping key to generate a response that includes the backup record of the data to be saved on the surrogate edge device 7201b and to recover the backed-up data in a data recovery operation. The PIN is used herein as a backup-retrieval code to verify that the user who seeks to recover data (as described hereinbelow) is the originating user or has authority to affect the recovery. In alternative embodiments the backup-retrieval code may be a password, a biometric, a challenge-response dialog, or any other mechanism by which the backup record may be protected.

The originator edge device (ED-A) 7201a generates a response, R, that is a response to the request to export the critical data (from step 7607), step 7617. The response R is generated using the following mechanism from the critical data (CD1-A) to be backed up:

| | |
|---|---|
| ED ← E{CD1-A}WK | ! encrypt the critical data with the wrapping key |
| H ← SHA-256 (PIN) | ! hash the PIN using SHA-256 (or other hashing function) |
| Payload ← H+ED | ! determine "payload" |
| R ← E{Payload} EK-pub-B | ! encrypt using the public key of the surrogate |

The originator edge device (ED-A) 7201a transmits the response R to the vault-broker server 7109, step 7619.

The vault-broker server 7109 forwards the response R to the surrogate edge device (ED-B) 7201b as a "store data" command, step 7621.

The surrogate edge device (ED-B) 7201b extracts the data that it is to store, step 7623, using the following mechanism:

| | |
|---|---|
| Payload ← D{R} EK-prv-B | ! decrypt the message R using the private key of the surrogate |
| H,ED ← parse (Payload) | ! parse the payload to determine H and ED |

The surrogate edge device (ED-B) 7201*b* stores two pieces of data as a backup record 7417 in its surrogate-backup memory 417, namely, H, the hash of the PIN of the user A 7551, and ED, the encryption of the critical data CD1-A, step 7625. However, from the information stored and available on the surrogate edge device (ED-B) 7201*b*, it is not possible to derive the wrapping key (WK), PIN, or CD1-A. Furthermore, it is also not possible to know, from the perspective of the surrogate edge device (ED-B) 7201*b*, which edge device the data belongs to. That association is only known to the vault-broker server 7109.

The surrogate edge device (ED-B) 7201*b* sends a message confirming that the data extracted from R has been stored, step 7627.

The vault-broker server 7109 records that the data from the originator edge device (ED-A) 7201*a* has been successfully stored on]the surrogate edge device (ED-B) 7201*b* in the vault database 515, step 7629. The vault database 7515 maintains a record for each location that backup data from one edge device (originator) has been stored on another edge device (surrogate).

Data from any originator edge device (ED-A) 7201*a* maybe be stored on multiple surrogate edge devices (ED-B) 7201*b*. Thus, the procedure of FIG. 7 may be repeated several times with different secure elements taking the role of the surrogate edge device (ED-B) 7201*b*. Conversely, any surrogate edge device (ED-B) 7201*b* may be a surrogate for multiple originator edge devices (ED-A) 7201*a*. Thus, the procedure of FIG. 7 may be repeated for several edge devices each taking the role of the originator edge device (ED-A) 7201*a* where the surrogate edge device (ED-B) 7201*b* is one and the same surrogate edge device (ED-B) 7201*b*. Thus, the vault database 7515 may be a many-to-many mapping of originator edge devices (ED-A) 7201*a* to surrogate edge devices (ED-B) 7201*b*.

Recovery of Backed-up Data

Turning now to the recovery of backed-up data from a surrogate edge device (ED-B) 7201*b* in the embodiment in which a wrapping key is generated from a user-entered PIN, which is illustrated in the timing sequence diagram of FIG. 8. FIG. 8 is a data-flow diagram illustrating a mechanism for recovery of data from one surrogate edge device (ED-B) 7201*b* into another edge device 7201, here referred to as the target edge device (ED-A') 7201*a*', in the same implied circle of trust. The target edge device (ED-A') 7201*a*' does not need to be the same edge device 7201 as the one from which the backed-up data originated. Rather, a typical application is the loss of the originator edge device (ED-A) 7201*a* thereby necessitating the recovery of the data by the user of the originating edge device (ED-A) 7201*a* into a new target edge device (ED-A') 7201*a*'.

A preliminary step is that the User A' 7551' requests recovery of the data from the vault-broker server 7109, step 7701. This may be an out-of-band request, e.g., the user A' 7551' purchasing a new edge device 7201, the target edge device (ED-A') 7201*a*', and requesting recovery of the data from the service operator or mobile network operator, who operates the vault-broker server 7109.

Typically the user A 7551 of FIG. 7 is the same individual or entity as the user A' 7551' of FIG. 8. However, one task of the surrogate ED-B 7201*b* is to verify that.

The vault-broker server 7109 asks the target edge device (ED-A') 7201*a*' for its encryption key certificate, EK-cert-A', step 7703.

As discussed hereinabove, the critical data is encrypted using a wrapping key (WK). To recover the data, the wrapping key must be recovered, step 7704.

In the embodiment of FIG. 7, the wrapping key is generated using a one-way cryptographic function f(x) using a PIN entered by the user. The corresponding data-recovery embodiment is illustrated in FIG. 8.

In the embodiment of FIG. 8, the User A' 7551' must enter the correct PIN to recover the data. The flow of FIG. 8 is performed on each recovery attempt and could being viewed as inside a loop. To minimize attempts at illicit recovery of data, a PIN counter may be maintained and if a threshold has been exceeded by repeated recovery attempts, the recovery attempt is aborted. Thus, the PIN counter is checked, step 805, and if it has been exceeded, the process is aborted, step 807.

If the PIN counter has not been exceeded, step 805, the User A' 7551' is asked to enter their PIN, step 809. To be able to recover the data, the attempted PIN (PIN') must be the same as the PIN entered in step 713 to generate the backup record 415. The User A 7551' enters the attempted PIN', step 811, and it is transmitted to the target edge device (ED-A') 7201*a*', step 813.

The wrapper key is then generated from the attempted PIN, step 814:

| | |
|---|---|
| WK' ← SHA-256 (PIN') | ! hash the attempted PIN' using SHA-256 (or other hashing function) |

The target edge device (ED-A') 7201*a*' generates a response R' from the attempted PIN' using the following mechanism, step 7715:

| | |
|---|---|
| H' ← SHA-256 (PIN') | ! hash the attempted PIN' using SHA-256 (or other hashing function) |
| Payload ← H'+EK-cert-A' | ! determine "payload" |
| R' ← Payload | |

In the user-entered PIN alternative embodiment, the H' value may be computed from the attempted PIN rather than from the wrapper key, WK', i.e.:

| | |
|---|---|
| H' ← SHA-256 (PIN') | ! hash the attempted PIN' using SHA-256 (or other hashing function) |

The target edge device (ED-A') 7201*a*' transmits the response R' to the vault-broker server 7109, step 7717.

Upon receipt of the response R', the vault-broker server 7109 looks up which edge device 7201 is a surrogate edge device that has stored a backup for the requested data, step 7719; here, the surrogate edge device (ED-B) 7201*b*.

The vault-broker server 7109 forwards the request R' to the surrogate edge device (ED-B) 7201*b*, step 7721.

The surrogate edge device (ED-B) 7201*b* verifies the request R', step 7723. The verification has several substeps:
  Verify EK-cert-A' as being signed by TK-cert.
  Extract EK-pub-A'. EK-cert-A' is a signed version of EK-pub-A'. The certificate contains the EK-pub-A'. Thus, EK-pub-A' is trivially recovered from EK-cert-A'.

Extract H' from request R'
Compare H' against the stored H, stored in the backup record 7415 corresponding to the received EK-cert-A' stored in Step 7625 of FIG. 7.
Reject the request if either EK-cert-A' is not verified or if H' is not equal to H. The rejection is reflected in the response message.

If the verification is satisfied, the edge device B 7201*b* generates a response R2 as follows (step 7725):

```
If verified:
    Payload ←
        SuccessCode + ED    ! Success, lookup
                              ED and add to
                              payload
Else
    Payload ← Error         ! Verification failed,
    code                      send error code
R2 ← E{Payload}             ! encrypt the Payload
EK-pub-A'
```

The surrogate edge device (ED-B) 7201*b* sends the generated response R2, which contains either an error code or a message with a success code with the encrypted data, step 7727. The encrypted data (ED) is the same encrypted data as originally supplied by the originator edge device (ED-A) 7201*a* as part of the response R generated in step 7617 of FIG. 7 and transmitted as a storeData command to the surrogate edge device (ED-B) 7201*b* in step 7621 of FIG. 7.

The vault-broker server 7109 forward the response R2 in a recover data command, step 7729.

The target edge device (ED-A') 7201*a*' extracts the data from the response R2 as follows, step 7731:

```
Payload ← D{R2}          ! decrypt the Payload
EK-prv-A'                  using private key of
                           the new target
                           edge device (ED-A')
                           7201a'
If Payload =             ! Error code received;
Error code                 bad WK (or PIN)
    ErrorCount++         ! Increment the Error Count
Else
    ED ←                 ! Success, Extract the
    Parse(Payload)         ED from the Payload
                           by removing the
                           SuccessCode
    CD1-A ←              ! Decrypt the WK encrypted
    D{ED}WK'               data to recover
                           the backed-up data
```

In case the Error code was received, step 7733, the PINCounter is incremented. Otherwise, the CD1-A is recovered and saved in the target edge device (ED-A') 7201*a*', step 7737.

Regardless of successful recovery or an error, the restore status is reported back to the vault-broker server 7109, step 7739. In the event of an error, the process may be repeated and the user A 7551 may attempt additional PIN entries until the threshold is exceeded.

From the foregoing it will be apparent that an efficient and secure mechanism for backing up and recovering private data stored on secure elements is provided.

Although specific embodiments of the invention have been described and illustrated, the invention is not to be limited to the specific forms or arrangements of parts so described and illustrated. The invention is limited only by the claims.

We claim:

1. A method for backing up critical data stored on an originator edge device associated with a user such that the backed up critical data may be recovered onto a target edge device, the method comprising:
    requesting, by a vault-broker server, the originator edge device to create an export backup record of critical data stored on the originator edge device;
    generating a wrapping key;
    generating, by the originator edge device, the export backup record in response to the request for the export backup record, the export backup record being a function of the wrapping key, a cryptographic key, and the critical data being backed up;
    transmitting a backup-response message including the export backup record, by the originator edge device to the vault-broker server;
    transmitting the backup-response message including the export backup record by the vault-broker server to a surrogate edge device;
    storing the export backup record on the surrogate edge device without information allowing the surrogate edge device to access the critical data backed up from the originator edge device; and
    storing an association between the originator edge device and the surrogate edge device on the vault-broker server.

2. The method of claim 1 comprising:
    establishing at least one implied circle of trust among edge devices based on a common cryptographic key issued by a trusted certificate authority or knowledge of a certificate of the trusted certificate authority;
    provisioning the surrogate edge device with a certificate issued by the trusted certificate authority;
    selecting, by the vault-broker server, the surrogate edge device from an implied circle of trust to which the originator edge device belongs; and
    verifying, by the originator edge device, that the surrogate edge device belongs to the same implied circle of trust as the originator edge device by checking the certificate of the surrogate edge device using the common cryptographic key or the knowledge of the certificate of the trusted certificate authority.

3. The method of claim 2, wherein the implied circle of trust includes multiple surrogate edge devices and the method further comprises, for each surrogate edge device of a plurality of such multiple surrogate edge devices, repeating the steps of:
    requesting, by the vault-broker server, the originator edge device to create an export backup record of critical data stored on the originator edge device;
    generating a wrapping key;
    generating, by the originator edge device, the export backup record in response to the request for the export backup record, the export backup record being a function of the wrapping key, a cryptographic key, and the critical data being backed up;
    transmitting a backup-response message including the export backup record, by the originator edge device to the vault-broker server;
    transmitting the backup-response message including the export backup record by the vault-broker server to said each surrogate edge device;
    storing the export backup record on said each surrogate edge device; and
    storing an association between the originator edge device and said each surrogate edge device on the vault-broker server.

4. The method of claim 1 comprising:
establishing at least one implied circle of trust among edge devices based on a common cryptographic key issued by a trusted certificate authority;
provisioning the target edge device with a certificate issued by the trusted certificate authority; and
verifying, by the surrogate edge device, that the target edge device belongs to the same implied circle of trust as the originator edge device by checking the certificate of the target edge device using the common cryptographic key.

5. The method of claim 1, wherein
the export backup record is generated by:
encrypting the critical data using the wrapping key;
hashing the wrapping key; and
creating the export backup record from the encrypted critical data and the hashed wrapping key; and
the backup-response message is generated by encrypting the export backup record with a cryptographic key of the surrogate edge device.

6. The method of claim 1, wherein
the export backup record is generated by:
creating a wrapping key as a function of a backup-retrieval code;
encrypting the critical data using the wrapping key;
creating a hash value by hashing the wrapping key or the backup-retrieval code; and
creating the export backup record from the encrypted critical data and the hashed value; and
the backup-response message is generated by encrypting the export backup record with a cryptographic key of the surrogate edge device.

7. The method of claim 6, wherein the backup-retrieval code is entered by the user of the originator edge device.

8. The method of claim 6, wherein the backup-retrieval code is a personal identification number, a biometric, a password, or a challenge-response dialog.

9. The method of claim 1, further comprising recovering the backed up private data on the target edge device, comprising:
generating, by the target edge device, a recovery-retrieval-code message and transmitting the recovery-retrieval-code message to the vault-broker server;
determining, by the vault-broker server, a surrogate edge device on which the export backup record of the originator edge device from which recovery is sought has been saved;
forwarding, by the vault-broker server, the recovery-retrieval-code message to the recovery surrogate edge device;
validating, by the recovery surrogate edge device, the recovery-retrieval-code message; and
upon successful validation of the recovery-retrieval-code message, transmitting a recovery-response message including the export backup record of the originator edge device to the vault-broker server; and
upon failure of the validation of the recovery-retrieval-code message, transmitting a recovery-response message including an error code;
forwarding, by the vault-broker server, the recovery-response message to the target edge device; and
in response to the recovery-response message including the export backup record, recovering, by the target edge device, the export backup record; and
in response to the recovery-response message including the error code, allowing the user an additional attempt to provide a valid backup-retrieval code.

10. The method of claim 9, wherein the recovery-retrieval-code message includes a hash value of a wrapping key or a backup-retrieval code and an encryption key certificate of the target edge device.

11. The method of claim 9, comprising:
establishing at least one implied circle of trust among edge devices based on a common cryptographic key issued by a trusted certificate authority or knowledge of a certificate of the trusted certificate authority;
provisioning the target edge device with a certificate issued by the trusted certificate authority; and
verifying, by the surrogate edge device, that the target edge device belongs to the same implied circle of trust as the originator edge device by checking the certificate of the target edge device using the common cryptographic key.

12. The method of claim 11, wherein the implied circle of trust includes multiple surrogate edge devices and the method further comprises, for each surrogate edge device of a plurality of such multiple surrogate edge devices, repeating the steps of:
requesting, by the vault-broker server, the originator edge device to create an export backup record of critical data stored on the originator edge device;
generating a wrapping key;
generating, by the originator edge device, the export backup record in response to the request for the export backup record, the export backup record being a function of the wrapping key, a cryptographic key, and the critical data being backed up;
transmitting a backup-response message including the export backup record, by the originator edge device to the vault-broker server;
transmitting the backup-response message including the export backup record by the vault-broker server to said each surrogate edge device;
storing the export backup record on said each surrogate edge device; and
storing an association between the originator edge device and said each surrogate edge device on the vault-broker server.

13. The method of claim 9, wherein
the export backup record is generated by:
encrypting the critical data using the wrapping key;
hashing the wrapping key; and
creating the export backup record from the encrypted critical data and the hashed wrapping key; and
the backup-response message is generated by encrypting the export backup record with a cryptographic key of the surrogate edge device.

14. The method of claim 9, wherein
the export backup record is generated by:
creating a wrapping key as a function of a backup-retrieval code;
encrypting the critical data using the wrapping key;
creating a hash value by hashing the wrapping key or the backup-retrieval code; and
creating the export backup record from the encrypted critical data and the hashed value; and
the backup-response message is generated by encrypting the export backup record with a cryptographic key of the surrogate edge device.

15. The method of claim 14, wherein the backup-retrieval code is entered by the user of the originator edge device.

16. The method of any of claim 14, wherein the backup retrieval code is a personal identification number, a biometric, a password, or a challenge-response dialog.

17. A system comprising:
a vault-broker server, an originator edge device, a surrogate edge device, and a target edge device, wherein
the vault-broker server is configured to request the originator edge device to create an export backup record of critical data stored on the originator edge device;
wherein the vault-broker server or the originator edge device is configured to generate a wrapping key;
wherein the originator edge device is configured to:
generate the export backup record in response to the request for the export backup record, the export backup record being a function of the wrapping key, a cryptographic key, and the critical data being backed up;
transmit a backup-response message including the export backup record to the vault-broker server;
wherein the vault-broker server is further configured to:
transmit the backup-response message including the export backup record by the vault-broker server to the surrogate edge device; and
store an association between the originator edge device and the surrogate edge device on the vault-broker server; and
wherein the surrogate edge device is configured to store the export backup record without information allowing the surrogate edge device to access the critical data backed up from the originator edge device.

18. The system of claim 17,
wherein the originator edge device, the surrogate edge device, and the target edge device are members of an implied circle of trust based on a common cryptographic key issued by a trusted certificate authority or knowledge of a certificate of the trusted certificate authority;
wherein the surrogate edge device is provisioned with a certificate issued by the trusted certificate authority;
wherein the vault-broker server is configured to select the surrogate edge device from the implied circle of trust to which the originator edge device belongs; and
wherein the originator edge device is configured to verify that the surrogate edge device belongs to the implied circle of trust to which the originator edge device belongs by checking the certificate of the surrogate edge device using the common cryptographic key.

19. The system of claim 18, wherein the implied circle of trust includes multiple surrogate edge devices.

20. The system of claim 17,
wherein the originator edge device, the surrogate edge device, and the target edge device are members of an implied circle of trust based on a common cryptographic key issued by a trusted certificate authority or knowledge of a certificate of the trusted certificate authority;
wherein the target edge device is provisioned with a certificate issued by the trusted certificate authority; and
wherein the surrogate edge device is configured to verify that the target edge device belongs to the implied circle of trust to which the originator edge device belongs by checking the certificate of the target edge device using the common cryptographic key.

21. The system of claim 17 wherein the originator edge device is configured to:
generate the export backup record by:
encrypting the critical data using the wrapping key;
hashing the wrapping key; and
creating the export backup record from the encrypted critical data and the hashed wrapping key; and
generate backup-response message by encrypting the export backup record with a cryptographic key of the surrogate edge device.

22. The system of claim 17, wherein the originator edge device is configured to:
generate the export backup record by:
creating a wrapping key as a function of a backup-retrieval code;
encrypting the critical data using the wrapping key;
creating a hash value by hashing the wrapping key or the backup-retrieval code; and
creating the export backup record from the encrypted critical data and the hashed value; and
generate the backup-response message by encrypting the export backup record with a cryptographic key of the surrogate edge device.

23. The system of claim 22, wherein the backup-retrieval code is entered by the user of the originator edge device.

24. The system of claim 22, wherein the backup-retrieval code is a personal identification number, a biometric, a password, or a challenge-response dialog.

25. The system of claim 17, wherein the wrapping key is generated and saved by the vault-broker server.

26. The system of claim 17 wherein to recover backed up private data onto the target edge device:
the target edge device is configured to generate a recovery-retrieval-code message and transmitting the recovery-retrieval-code message to the vault-broker server;
the vault-broker server is further configured to:
determine a surrogate edge device on which the export backup record of the originator edge device from which recovery is sought (the recovery surrogate edge device) has been saved;
forward the recovery-retrieval-code message to the recovery surrogate edge device;
the recovery surrogate edge device is configured to:
validate the recovery-retrieval-code message;
upon successful validation of the recovery-retrieval-code message, transmit a recovery-response message including the export backup record of the originator edge device to the vault-broker server; and
upon failure of the validation of the recovery-retrieval-code message, transmit a recovery-response message including an error code;
wherein the vault-broker server is further configured to forward the recovery-response message to the target edge device; and
wherein the target edge device is further configured to:
if the recovery-response message includes the export backup record, recover the export backup record; and
if the recovery-response message includes the error code, allow the user an additional attempt to provide a valid backup-retrieval code.

27. The system of claim 26 wherein the recovery-retrieval-code message includes a hash of an attempted backup-retrieval code or attempted wrapping key and an encryption key certificate of the target edge device.

28. The system of claim 26,
wherein the originator edge device, the surrogate edge device, and the target edge device are members of an implied circle of trust based on a common cryptographic key issued by a trusted certificate authority or knowledge of a certificate of the trusted certificate authority;
wherein the surrogate edge device is provisioned with a certificate issued by the trusted certificate authority;
wherein the vault-broker server is configured to select the surrogate edge device from the implied circle of trust to which the originator edge device belongs; and
wherein the originator edge device is configured to verify that the surrogate edge device belongs to the implied circle of trust to which the originator edge device belongs by checking the certificate of the surrogate edge device using the common cryptographic key.

29. The system of claim 28, wherein the implied circle of trust includes multiple surrogate edge devices.

30. The system of claim 26,
wherein the originator edge device, the surrogate edge device, and the target edge device are members of an implied circle of trust based on a common cryptographic key issued by a trusted certificate authority or knowledge of a certificate of the trusted certificate authority;
wherein the target edge device is provisioned with a certificate issued by the trusted certificate authority; and
wherein the surrogate edge device is configured to verify that the target edge device belongs to the implied circle of trust to which the originator edge device belongs by checking the certificate of the target edge device using the common cryptographic key.

31. The system of claim 26 wherein the originator edge device is configured to:
generate the export backup record by:
encrypting the critical data using the wrapping key;
hashing the wrapping key; and
creating the export backup record from the encrypted critical data and the hashed wrapping key; and
generate the backup-response message by encrypting the export backup record with a cryptographic key of the surrogate edge device.

32. The system of claim 26, wherein the originator edge device is configured to:
generate the export backup record by:
creating a wrapping key as a function of a backup-retrieval code;
encrypting the critical data using the wrapping key;
creating a hash value by hashing the wrapping key or the backup-retrieval code; and
creating the export backup record from the encrypted critical data and the hashed value; and
generate the backup-response message by encrypting the export backup record with a cryptographic key of the surrogate edge device.

33. The system of claim 32, wherein the backup-retrieval code is entered by the user of the originator edge device.

34. The system of claim 32, wherein the backup-retrieval code is a personal identification number, a biometric, a password, or a challenge-response dialog.

35. The system of claim 26, wherein the wrapping key is generated and saved by the vault-broker server.

\* \* \* \* \*